United States Patent [19]
Baldwin et al.

[11] Patent Number: 5,953,339
[45] Date of Patent: Sep. 14, 1999

[54] LOGICAL LINK CONNECTION SERVER

[75] Inventors: John Henry Baldwin, Morristown; Bharat Tarachand Doshi, Holmdel; Subrahmanyam Dravida, Freehold; Hong Jiang, Westfield, all of N.J.; Wassim A. Matragi, Brooklyn, N.Y.; Sanjiv Nanda, Plainsboro, N.J.

[73] Assignee: Lucent Technologies Inc., Murray Hill, N.J.

[21] Appl. No.: 08/839,475

[22] Filed: Apr. 14, 1997

[51] Int. Cl.[6] ............................. H04L 12/56; H04J 3/16; G01R 31/08; G06F 11/00

[52] U.S. Cl. ........................ 370/397; 370/230; 370/465

[58] Field of Search .................................. 370/389, 392, 370/395, 396, 397, 338, 409, 470, 471, 474, 328, 465, 466, 230

[56] References Cited

U.S. PATENT DOCUMENTS

| | | | |
|---|---|---|---|
| 5,511,076 | 4/1996 | Ramakrishnan et al. | 370/465 |
| 5,812,526 | 9/1998 | Chang et al. | 370/230 |
| 5,818,842 | 10/1998 | Burwell et al. | 370/397 |

OTHER PUBLICATIONS

John H. Baldwin, B. H. Bharucha, Bharat T. Doshi, Subrahmanyam Dravida and Sanjiv Nanda, "AAL–2—A New ATM Adaptation Layer for Small Packet Encapsulation and Multiplexing" Bell Labs Technical Journal, vol. 2, No. 2, Mar. 21, 1997, pp. 111–131.

*Primary Examiner*—Hassan Kizou
*Assistant Examiner*—Afsar M. Qureshi
*Attorney, Agent, or Firm*—Joseph J. Opalach

[57] ABSTRACT

A digital cellular/personal communications service (PCS) application incorporates a logical link connection (LLC) server. In this approach, there are two ATM connections in the path of an AAL-2 connection: one between a base station and the LLC Server and the other between the LLC Server and a vocoder group. All LLCs from, or to, a given base station use a common ATM connection irrespective of the vocoder used at the other end. Similarly, all LLCs from, or to, a given vocoder group use a common ATM connection irrespective of the destination base station at the other end. At the LLC Server, LLC packets from many base stations destined for the same vocoder group are extracted and bundled into the ATM connection between the LLC Server and the destination vocoder group. Similar treatment is given to the packets originating at vocoders and destined for base stations. Thus, each ATM connection between a particular base station and the LLC server and each ATM connection between the LLC Server and a particular vocoder group are used to maximum capacity notwithstanding each ATM connection conveys LLCs to different LLC endpoints.

39 Claims, 5 Drawing Sheets

FIG. 2

| CID<br>8 BITS | LI<br>6 BITS | RES<br>5 BITS | HEC<br>5 BITS |
|---|---|---|---|

PACKET HEADER (3 OCTETS)

FIG. 3

◄──────────── STF (OCTET) ────────────►

| OFFSET FIELD (OSF)<br>6 BITS | SEQUENCE NUMBER (SN)<br>1 BIT | PARITY (P)<br>1 BIT |
|---|---|---|

FIG. 6
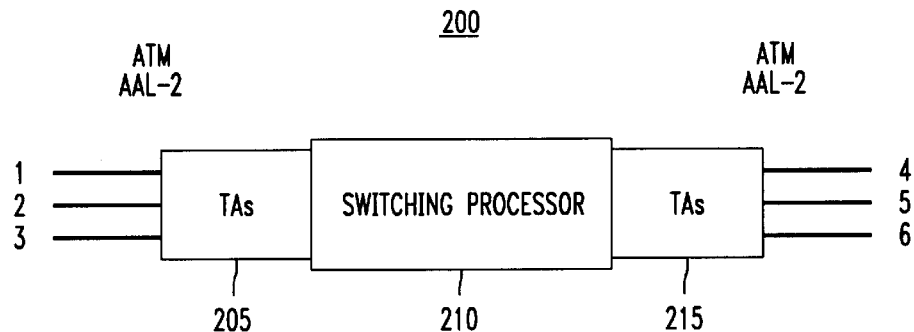
FIG. 7
ROUTING TABLE
| TA205 (INCOMING) | | | TA215 (OUTGOING) | | |
|---|---|---|---|---|---|
| PORT | VPI/VCI | CID | PORT | VPI/VCI | CID |
| 1 | 2/3 | 4 | 5 | 1/2 | 1 |
| 3 | 2/2 | 3 | 5 | 1/2 | 2 |
FIG. 8
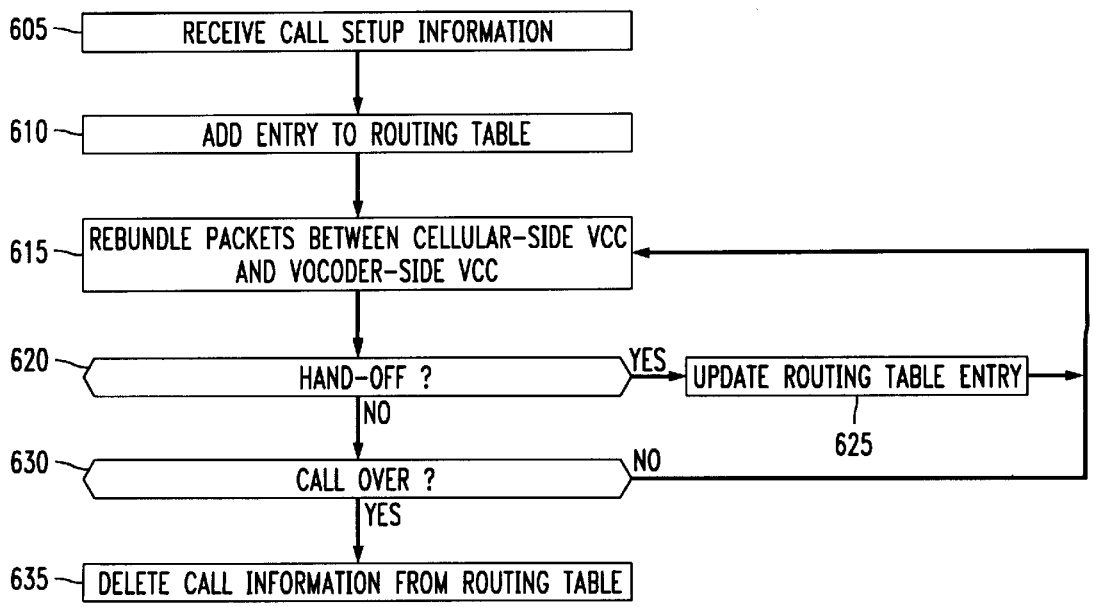

LOGICAL LINK CONNECTION SERVER

FIELD OF THE INVENTION

This invention relates generally to communications and, more particularly, to switching systems or server-type equipment.

BACKGROUND OF THE INVENTION

Asynchronous transfer mode (ATM) networks carry fixed sized cells within the network irrespective of the applications being carried over ATM. At the network edge or at the end equipment, an ATM Adaptation Layer (AAL) maps the services offered by the ATM network to the services required by the application. There are a number of industry standards and proposed standards covering various AALs. In particular, "B-ISDN ATM Adaptation Layer Type 2 Specification," draft Recommendation I.363.2, November 1996, of ITU-T (herein referred to as AAL-2) provides for efficient ATM transport of small, delay-sensitive packets in such applications as: PBX to PBX trunking over an ATM backbone; base station to switch trunking for digital cellular/personal communications service (PCS) over an ATM infrastructure; trunking between circuit switches in voice networks; and telephony gateway to Internet.

Generally speaking, AAL-2 provides the ability to efficiently fill ATM cells with packets that are smaller than the ATM cell size. Each such "small packet" conveys data between endpoints of "Logical Link Connections." (As defined in AAL-2, each such "small packet" includes an LLC identifier, which is a "called connection ID" or CID.) Each ATM connection, or virtual circuit connection (VCC), has a capacity to support a number of LLCs. Each ATM cell, while having a single virtual circuit identifier (VCI) may have packets with different CIDs.

However, many AAL-2 applications require multiple logical link connections between multiple sources and multiple destinations. For example, in the above-mentioned digital cellular/PCS application, a base station may handle multiple calls, each to a different vocoder resource (also referred to as a vocoder set or vocoder group). Many base stations have multiple point-to-point ATM connections to multiple vocoder groups. In this case, AAL-2 is used on the point-to-point ATM connections. Unfortunately, efficiency of AAL-2 degrades significantly in these situations because the multiplexing advantage of AAL-2 relies on having many LLCs on the same ATM connection.

SUMMARY OF THE INVENTION

We have realized that it is desirable to rebundle AAL-2 packets when multiple sources and destinations are involved in multiple end-to-end connections. Therefore, and in accordance with the inventive concept, an apparatus switches AAL-2 packets from one ATM connection to another ATM connection. This switching is performed at the sub-ATM cell level, e.g., at a logical link connection (LLC) level.

In an embodiment of the invention, a digital cellular/PCS application incorporates an LLC server. In this approach, there are two ATM connections in the path of an AAL-2 connection: one between a base station and the LLC Server and the other between the LLC Server and a vocoder group. All LLCs from, or to, a given base station use a common ATM connection irrespective of the vocoder used at the other end. Similarly, all LLCs from, or to, a given vocoder group use a common ATM connection irrespective of the destination base station at the other end. At the LLC Server, LLC packets from many base stations destined for the same vocoder group are extracted and bundled into the ATM connection between the LLC Server and the destination vocoder group. Similar treatment is given to the packets originating at vocoders and destined for base stations. Thus, each ATM connection between a particular base station and the LLC server, and each ATM connection between the LLC Server and a particular vocoder, group are used to maximum capacity notwithstanding each ATM connection conveys LLCs to different LLC endpoints.

Other embodiments are possible. For example, one or more LLC servers perform a rebundling function in an ATM network connecting PBXs or public switches. Each PBX includes circuitry for performing voice compression, silence suppression, and circuit/ATM conversion between the PBX (or switch) and the ATM network.

BRIEF DESCRIPTION OF THE DRAWING

FIG. 2 shows a packet header of an LLC packet in accordance with AAL-2;

FIG. 3 shows a start field of an ATM cell in accordance with AAL-2;

FIG. 6 shows an illustrative block diagram of an LLC Server in accordance with the principles of the invention;

FIG. 7 shows an illustrative routing table for use in an LLC server in accordance with the principles of the invention;

FIG. 8 shows an illustrative method for use in an LLC server in accordance with the principles of the invention;

DETAILED DESCRIPTION

Figure 1:
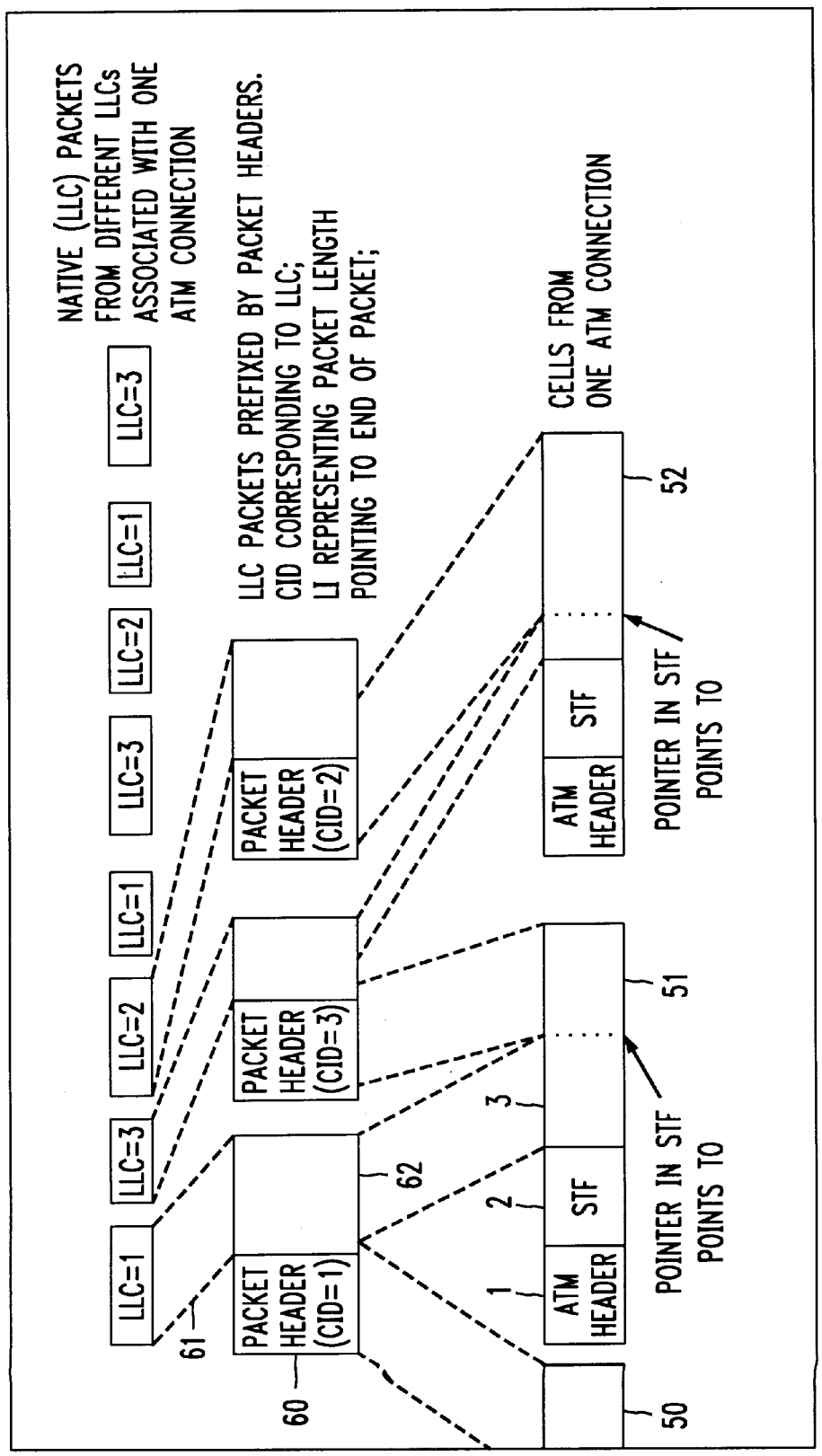
FIG. 1 shows an illustrative ATM cells and AAL-2 formatting.

Before describing an illustrative embodiment of the invention, some background information on ATM Adaptation Layers (AALs) and, more particularly, AAL-2, is provided.

ATM networks carry fixed size (53 octets) cells within the network irrespective of the applications being carried over ATM. To support applications in native protocol mode, a Terminal Adapter (TA) at the network edge acts as an 'ATM user' and implements an ATM Adaptation Layer (AAL) to map the services offered by the ATM network to the services required by the application. In cases where ATM is terminated at the end user equipment, the AAL entity is implemented there. AAL-1 has been defined for Constant Bit Rate (CBR) traffic requiring tight delay and jitter control (e.g., see ITU-T Recommendation I.36.1 B-ISDN ATM Adaptation Layer AAL-1 Specification). Also AAL-3/4 (e.g., see ITU-T Recommendation I.363.3/4 B-ISDN ATM Adaptation Layer AAL3/4 Specification) and AAL-5 (e.g., see ITU-T Recommendation I.363.5 B-ISDN ATM Adaptation Layer AAL-5 Specification) have been defined for burst) data. These AALs allow simple encapsulation of application 'packets' if each packet fits into one ATM cell. For larger application packets, a segmentation and reassembly (SAR) layer in AAL-3/4 and AAL-5 allows segmentation of a 'packet' at the transmitter, so each segment fits into an ATM cell, and reassembly of the original packet from the received ATM cells at the receiver. These AALs thus allow collection of enough information to fit into one ATM cell payload or segmentation of larger native mode packets into smaller units such that each smaller unit fits into an ATM cell payload. If native information units are smaller than an ATM payload, these AALs require partial fill of ATM cells.

However, many applications require ATM transport of 'small packets' that are smaller than the ATM cell size. Some of these applications are: PBX-to-PBX trunking for compressed voice with or without silence suppression; ATM backbone for cellular/PCS wireless access; ATM trunking between circuit switches; and ATM backbone connectivity to packet telephony.

In applications like the ones mentioned above, there are two primary reasons to transmit small packets across ATM networks: (i) when small native packets are generated away from the ATM network and the packet boundaries need to be recovered at the destination outside ATM network; and (ii) when the bit rate of a native application is low and the requirement on the end-to-end delay prohibits accumulation of bits to fill an ATM cell before sending the cell out to its destination. In the latter case, small packets are generated even if the packetization is done at the ATM network edge. Use of an ATM network to connect base stations to vocoder groups in digital cellular systems is an example of the former. ATM trunking between circuit switches or circuit PBXs is an example of the latter.

For these applications, partial fill of ATM cells resulting from use of AAL-1, AAL-3/4, or AAL-5, may cause unacceptable loss in bandwidth efficiency. This inefficiency is of concern especially when the total traffic demand needs low speed leased lines because of the high cost/bps (bits per second) of such lines. In many cases, this cost penalty may nullify many of the advantages offered by an ATM backbone. This necessitates use of an AAL for small packets such as AAL-2. The latter provides efficient transport of small native packets over ATM networks in such a way that allows very small transfer delay across the ATM network and still allows the receiver to recover the original packets.

AAL-2 treats the payloads from successive ATM cells from the same ATM connection as a byte stream in which variable length LLC packets are multiplexed. An illustration of ATM cells and AAL-2 formatting is shown in FIG. 1. An ATM connection comprises a plurality of ATM cells, a portion of which is represented by the sequence of ATM cells 50, 51, and 52. Each ATM cell comprises an ATM header 1 (as known in the art), an STF field 2 and a plurality of LLC packets 3. Each LLC packet, as represented by LLC packet 60 comprises a packet header 61 and a native LLC packet 62.

The packet header is 3 octets long and is shown in detail in FIG. 2. The packet header comprises four fields: a Channel ID (CID) field, a Length Indicator (LI) field, a Reserved (RES) field, and a Header Error Check (HEC) field.

The CID field is 8 bits long and identifies the LLC to which the packet belongs. (Referring briefly back to FIG. 1, it is can be observed that the CID field value for the associated LLC packet corresponds to the LLC number.) The CID field provides support for a maximum of 255 native connections (LLCs) over a single ATM VCC. As known in the art, an ATM cell header allows two levels of addressing: a Virtual Path Identifier (VPI) and Virtual Connection Identifier (VCI). A Virtual Path Connection (VPC) can have a number of VCCs. With a 16 bit VCI field, an ATM VPC can support up to $255 \times 2^{16}$ Logical Link Connections.

The LI field is 6 bits and indicates the length of the LLC packet (or native packet). The LI field is added to each LLC packet so that the end of variable length packets can be demarcated. The LI field allows specification of up to 64 octets. When the value of the LI field points beyond the end of the current ATM cell, the packet is split between cells (this is also illustrated in FIG. 1, where LLC packet 60 is split between ATM cells 50 and 51).

Since the primary driver for AAL-2 is packet telephony, and error detection is not essential for voice coding algorithms, error detection for native packets is not necessary. The purpose of error detection is to guarantee that CID, LI and other critical protocol header fields do not get misinterpreted. This is accomplished in AAL-2 by the HEC field in each packet header. The HEC field is 5 bits and provides error detection over the packet header. This has the advantage of being able to discard only those packets whose headers are corrupted.

AAL-2 is partitioned into two sublayers, the Common Part Sublayer (CPS) and the Service Specific Convergence Sublayer (SSCS). The RES field comprises five bits, which are reserved or assigned to either the CPS or a Service Specific Convergence Function (SSCF) of the SSCS. The CPS provides the functions of multiplexing variable length packets from multiple sources into a single ATM virtual circuit and relaying these packets to form end-to-end AAL-2 connections. That portion (not shown) of the RES field assigned to the CPS are used to provide signaling such as a "More" bit to indicate that the current packet is segmented, signaling, or user information. The remaining portion (not shown) of the RES field assigned to the SCSF provides an application specific function, a different instance of being provided to each AAL-2 user. Examples of such functions are segmentation and reassembly of user flows into packets suitable for the common part, forward error control, identifying the voice coding algorithm, identifying the end of a speech burst, packet sequence number, etc. The SSCS can also be null. (At this point, the ITU-T standards body intends to specify SSCS protocols in future recommendations.) These SCSF-oriented bits are not interpreted by the AAL-2 CPS and are passed transparently from the transmitting SSCS to the receiving SSCS. The SSCS may use these bits for specific SSCF functions or to pass higher layer user-to-user communication transparently.

As can be observed from FIG. 1, a Start Field (STF) is present at the beginning of each ATM cell payload from a given ATM connection. The format of the STF field is shown in FIG. 3. An STF field is 1 octet in length and comprises an Offset field (OSF), a Sequence Number (SN) field and a Parity (P) field.

While the LI field in each LLC packet allows self delineation once a packet boundary is identified, a cell loss or an error in a packet header results in the loss of packet delineation. In order to regain packet boundaries, the OSF field specifies the beginning of the first new packet in the current ATM cell payload. The OSF field is 6 bits in length and indicates the remaining length of the packet that (possibly) started in the preceding cell from this ATM connection and is continuing in the current cell. This approach guarantees resynchronization of packet boundaries in one ATM cell time after a delineation loss.

Given that a loss of an ATM cell, if not detected at the receiver, can misconcatenate packets, the SN field also exists. The one bit SN field provides a modulo sequence numbering of cells and immediate detection of a single cell loss.

Finally, like the packet header, the SN field and OSF field also require error detection. This is provided by the single parity bit of the P field, which provides odd parity.

It should be noted that it may be necessary to transmit a partially filled ATM cell in order to limit the packet emission delay. In this case, the remainder of the cell is padded with all-zero octets. A cell whose payload contains only the STF field and 47 padding octets can also be transmitted in order to meet some other needs such as serving a "keep-alive" function, satisfying a traffic contract, etc.

AAL-2 creates multiple levels of connections between two points: ATM virtual connections and AAL-2 Logical Link Connections (LLCs). The AAL-2 LLC in this case is defined to be a point-to-point connection, for example, between a base station and the vocoder group in the Mobile Switching Center (MSC) for cellular trunking, or between two PBX's or two switches for land-line trunking. The connection is defined to be bi-directional and the same CID is assumed to be used in both directions for a particular LLC. The set of CIDs available on an ATM VCC are known to both ends.

The negotiation procedures are symmetric, that is either end of the AAL-2 connection is permitted to initiate a new LLC or request tear down of an LLC. A simple negotiation procedure is defined where the originating end proposes establishment of a new LLC with the use of a particular CID that is not in use and the other end can accept or deny the request. Bandwidth management and monitoring for the ATM virtual circuit is assumed to be handled at the ATM connection management level. No such monitoring is proposed per LLC. However, it is the responsibility of the two end points to guarantee resource availability within the ATM connection to support a new LLC. Such resource management is assumed to be handled in a service specific manner. Signaling needed for LLC set up and tear down between AAL-2 uses a predefined LLC (with CID=0).

Figure 4:
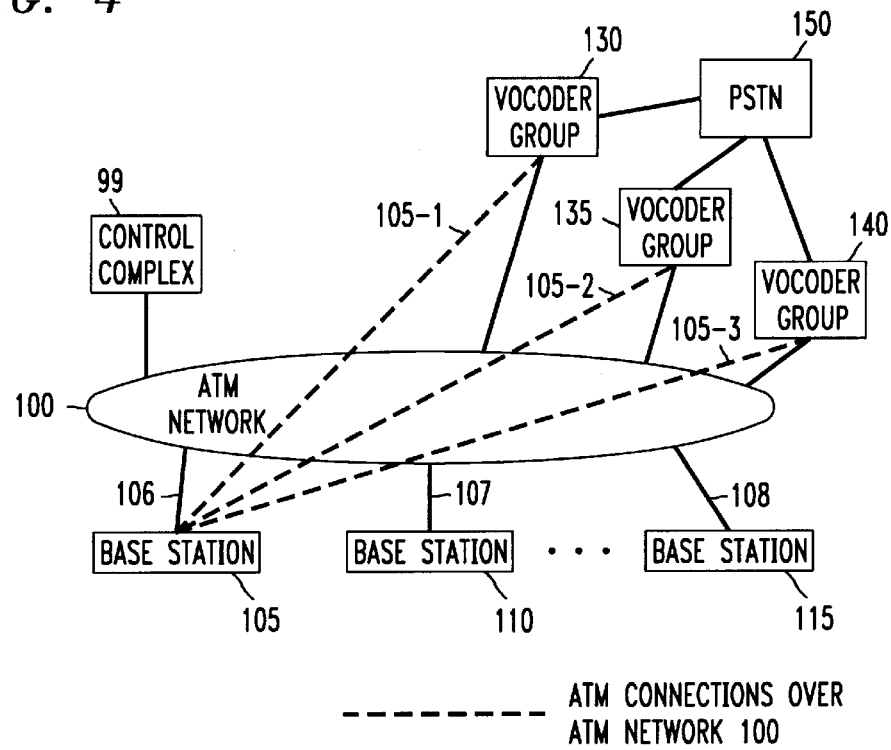
FIG. 4 shows an illustrative ATM-based cellular architecture using AAL-2.

An illustrative ATM architecture using AAL-2 is shown in FIG. 4, which shows ATM in the context of a wireless infrastructure. In this architecture, cellular sites (cell sites) or base stations 105, 110, and 125 are connected to ATM network 100 via facilities 106, 107, and 108, respectively. These facilities are Ti as known in the art. (For ease of description, this architecture is simplified, e.g., there are typically hundreds of base stations, etc.,). ATM network 100 comprises a plurality of ATM switching elements (not shown) as known in the art. As such, ATM network 100 provides connectivity between the air interface, as represented by each base station, and public-switched-telephone-network (PSTN) 150. Call control and signaling is provided by control complex 99 which communicates with each base station via a VCC (not shown) used for signaling and using, e.g., AAL-5. In this illustrative architecture, it is assumed that each base station provides digital service using code-division-multiple-access (CDMA) techniques as defined in TIA standard IS-95. For each cellular call, the associated base station becomes one of the two end points of an ATM connection and the home of an AAL. The other end of this ATM connection is one of a number of vocoder groups, as represented by vocoder groups 130, 135, and 140. Each vocoder group operates in accordance with IS-95 CDMA Rate Set 1 or Rate Set 2 for conversion to 64 kbps (thousands of bits per second). (As defined in IS-95 all voice call pass through a vocoder group. The latter comprises a plurality of vocoders, each of which is typically a circuit board (not shown) within a switching element (not shown) such as a 5ESS available from Lucent Technologies. A switching element may include a plurality of vocoder groups or sets of vocoder groups denoted as "PSUs" (Packet Switching Units) as known in the art.)

Current standards define point-to-point AAL-2 connections (LLCs) over an ATM VCC. Many applications may have ATM connections originating at multiple points going to many different destinations. In these cases, creating multiple ATM VCCs such that each can serve as a vehicle for a subset of point-to-point AAL-2 connections will lead to small number of LLCs per ATM connection thus degrading the efficiency with which the bandwidth is utilized. In the context of a cellular application as shown in FIG. 4, each base station is connected to each of the vocoder groups over a different VCC through ATM network 100. This is shown for base station 105 by VCCs 105-1, 105-2, and 105-3. Similarly, the other base stations have VCCs (not shown) to each vocoder group, e.g., VCCs 110-1, 110-2, and 110-3 for base station 110, and VCCs 115-1, 115-2, and 115-3 for base station 115. Typically, each base station needs an association with many different vocoder groups because of the need to manage hand-offs between base stations while leaving the PSTN interface unchanged during a voice call.

For example, assume that a cellular call is setup with base station 105. Control complex 99 assigns the new call to an LLC number within one of the VCCs associated with base station 105. (As a reminder, LLC numbers are only unique within a VCC.) In this example, assume that the new call is assigned LLC #1 and is also assigned to VCC 105-1, which uses vocoder group 130. (Call setup information transmitted from control complex 99 includes such items as the cell ID (herein associated with the VPI/VCI information) of the new call, the associated CID, and the identification information for the destination switch (not shown), which provides the vocoder group and particular vocoder for use in this call.)

Upon hand-off to, e.g., base station 110, control complex 99 coordinates the transfer of the call from base station 105 to base station 110 via the above-mentioned VCC signaling channel (not shown). In particular, the call remains with the assigned vocoder group (here vocoder group 130) but the call is assigned a new LLC # on VCC 110-1, e.g., LLC #2, which connects base station 110 to vocoder group 130. As such, in this scenario, each ATM VCC multiplexes calls from one base station to a particular vocoder group, which extracts the individual calls for processing by a particular vocoder of that group. Unfortunately, the use of multiple ATM VCCs from each base station may lead to a small number of LLCs per ATM VCC and hence to a significant loss of bandwidth efficiency notwithstanding the use of AAL-2.

Figure 5:
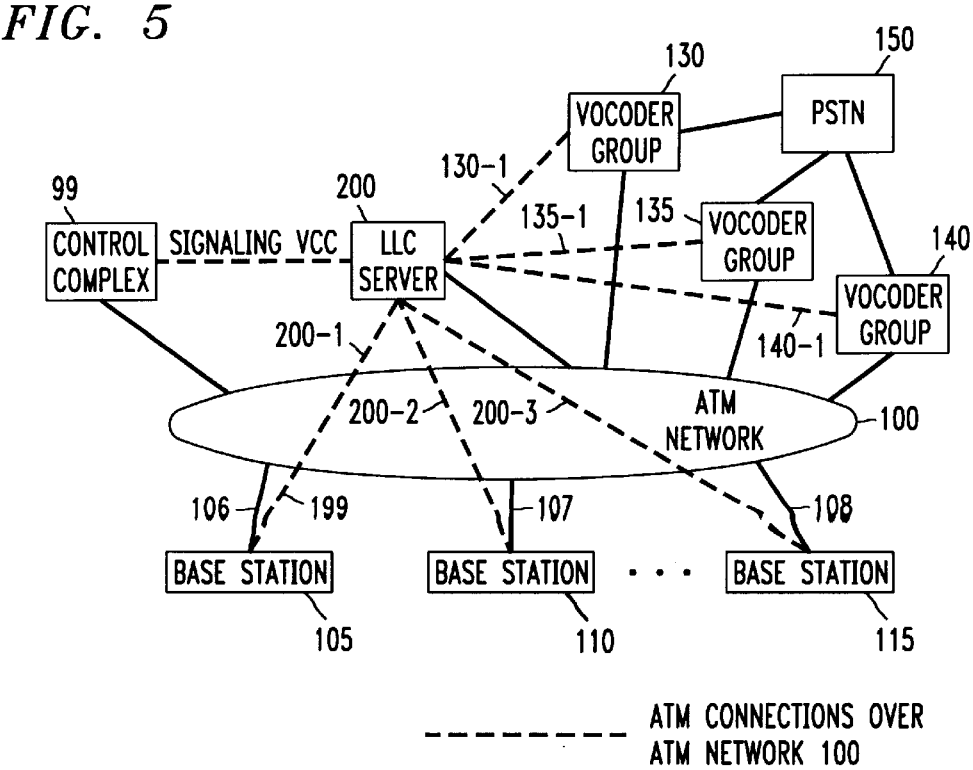
FIG. 5 shows an illustrative ATM-based cellular architecture using AAL-2 in accordance with the principles of the invention.

However, and in accordance with the inventive concept, the network of FIG. 4 is modified to incorporate a Logical Link Connection (LLC) Server as shown in FIG. 5. LLC Server 200 provides a "rebundling" function in the system of FIG. 5 by switching the LLCs within a particular VCC such that they are mixed with other LLCs from a different VCC. In this illustrative embodiment, there are now two ATM connections between a vocoder and a base station, one between the LLC server and the base station and the other between the LLC server and the vocoder group.

The ATM connection between a base station and LLC Server 200 is an ATM VCC using AAL-2, as illustrated by VCCs 200-1, 200-2, and 200-3, for base stations 105, 110, and 115, respectively. As such, all LLCs from, or to, a given base station use a common ATM VCC irrespective of the vocoder destination.

Similarly, the ATM connection between LLC Server 200 and a vocoder group is also an ATM VCC using AAL-2, as illustrated by VCCs 130-1, 135-1, and 140-1, for vocoder groups 130, 135, and 140, respectively. All LLCs from, or to, a given vocoder group use a common ATM VCC irrespective of the vocoder destination.

At LLC Server 200, LLC packets from a base station are extracted and mixed, or re-bundled, with those from other base stations. The packets are then segregated according to the destination vocoder group and bundled into the respective ATM connection between LLC Server 200 and the particular vocoder group. Similar treatment is given to the packets originating at vocoders and destined for base stations.

Before continuing with the description of FIG. 5, a general architecture for an LLC Server is shown in FIG. 6. Other than the inventive concept, the elements of FIG. 6 are well-known and will not be described. LLC Server 200 comprises a plurality of Terminal Adapters (TAs), here represented by TAs 205 and TAs 215. It is assumed that each TA includes circuitry for connecting at the physical layer of the respective ATM connections as well as operating in accordance with an ATM Adaptation Layer, e.g., AAL-2. TAs 205 couple to a plurality of physical facilities 1 to 6. Each facility is associated with a physical port of LLC Server 200. For simplicity, the port number is identified by each facility number shown in FIG. 6. Each facility supports ATM VCCs, each VCC providing multiple LLCs, as described above. Switching processor 210 includes stored-program-control processing circuitry, e.g., a microprocessor, and memory for storing instructions and data, and a switching fabric.

In accordance with the inventive concept, LLC Server 200 rebundles LLC packets in accordance with two routing tables, one for each direction of communication. An illustrative routing table is shown in FIG. 7 for one direction. The table is illustratively divided into two portions an "Incoming" side, associated with those LLC packets arriving at TAs 205, and an "Outgoing" side, associated with those LLC packets leaving TAs 215. (A similar routing table (not shown) exists for the other direction, i.e., "incoming" LLC packets arriving at TAs 215, etc.) Each row of the routing table maps a particular CID of a particular VCC (as represented by the VPI/VCI information in an ATM header) at a particular port to another port, VCC, and CID. As such, for each arriving LLC packet at TAs 205, LLC Server 200 switches the packet by rebundling the payload portion of the LLC packet into a new LLC packet with a "new" CID and providing this new LLC packet to the appropriate Port on the designated VCC. For example, the first row of the routing table of FIG. 7 designates that LLC packets arriving at Port 1 on VPI/VCI 2/3, with a CID of 4 are provided as LLC packets with a CID of 1 to Port 5 on VPI/VCI 1/2.

In the context of the cellular application shown in FIG. 5, assume that the TAs 205 are associated with LLCs to different base stations and that TAs 215 are associated with the vocoder groups. In this context, the "Incoming" side of the routing table of FIG. 7 is associated with the cellular-side and the "Outgoing" side is associated with the vocoder-side. Now, each row of the routing table maps an arriving LLC packet of a particular VCC at a particular port to a particular port, VCC, and CID on the "outgoing" side. The "outgoing" CID is associated with a particular vocoder. Similarly, in the reverse direction, for each arriving ATM cell from an identified vocoder, LLC Server 200 switches the payload into an LLC packet with the appropriate CID and into the associated VCC in accordance with the other routing table (not shown). (It should be noted that one routing table can be used if "Incoming" and "Outgoing" mappings are expected to be identical in both routing tables.) An illustrative method for use in LLC Server 200 is shown in FIG. 8. The above-mentioned routing table is updated in real-time by signaling communicated from control complex 99. In step 605, LLC Server 200 receives call setup information from control complex 99, via the signaling VCC. This call setup information includes the VPI/VCI (or cell ID) of a new call, the associated CID, and the destination switch (here the PSU), vocoder group and vocoder. In accordance with the inventive concept, each base station is only required to know the CID of the call—not the vocoder group. LLC Server 200 adds a new entry to its routing tables in step 610. This new entry includes the cell ID of the new call, the associated CID, and the destination switch, vocoder group and vocoder. In step 615, LLC Server 200 rebundles packets in accordance with the routing table assignments, between the cellular-side VCC and the vocoder-side VCC. If a hand-off is detected in step 620, via signaling received over the signaling VCC, LLC Server 200 updates the routing table in step 625. In particular, LLC Server 200 changes the cellular-side assignments by changing the cell ID (and therefore the associated cellular-side VCC) and CID field values. When termination of a call is finally detected in step 630, (via the above-mentioned signaling VCC), this particular row of the routing table is deleted in step 635.

Figure 9:
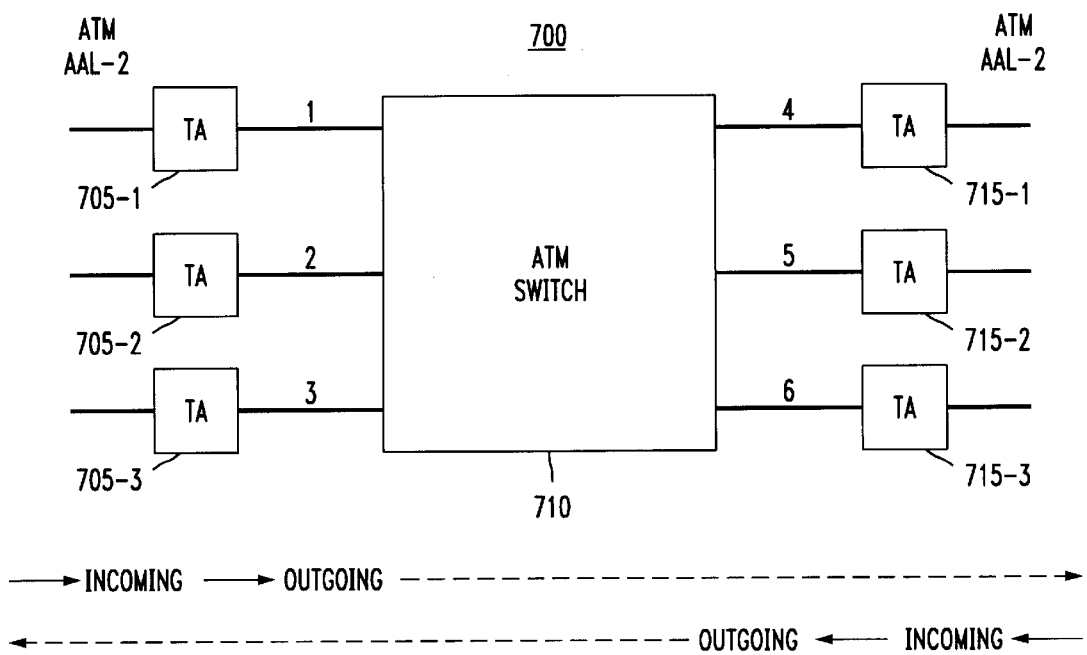
FIG. 9 shows an illustrative embodiment of an LLC Server.

The switching processor in an LLC server can take many forms. An illustrative embodiment is shown in FIG. 9. The elements of FIG. 9, other than the inventive concept, are known and will not be described in detail. LLC Server 700 comprises a plurality of terminal adapters (TAs) and ATM switch 710. The latter represents an ATM switch such as a Globeview-2000 switch available from Lucent Technologies. As known in the art, an ATM switch switches cells as a function of the information within each ATM cell header. As a result, in this embodiment, existing ATM switch technology is re-used to perform the switching—only TAs in accordance with the principles of the invention need to be constructed. In particular, each TA stores a copy of one routing table in its memory and functions as described in accordance with the method shown in FIG. 8. (Information for the routing tables is provided by the above-mentioned signaling VCC.) Illustratively, FIG. 9 indicates the "Incoming" and "Outgoing" directions. Since each TA provides an "Outgoing" LLC packet with the correct header information, only one routing table is required in each TA.

For example, each "Incoming" LLC packet received by TA 705-1 is provided to ATM switch 710 in an ATM cell in accordance with the above-described routing table, i.e., with suitably modified ATM headers and changed CID number. However, in this embodiment, an ATM cell provided to ATM switch 710 from a TA includes only one LLC packet. (Any bandwidth inefficiency is only over very short distances and uses a relatively inexpensive switching matrix.) Any empty portion of the ATM cell must be padded. As noted above, ATM switch 710 is designed to switch ATM cells as a function of ATM header information. In this example, this ATM header information includes the Port number and VPI/VCI values. (In this example, each TA is associated with one of six ports of ATM switch 710.)

Referring back to the routing table of FIG. 7, an LLC packet arriving at TA 705-1 is associated with port 1 of ATM switch 710. If the LLC packet is in VPI/VCI 2/3 and has a CID of 4, TA 705-1 provides an ATM cell for this LCC packet where the ATM header includes VPI/VCI 1/2 and where the LLC packet now has a CID of 1. ATM switch 710 switches the ATM cell to Port number 5, in accordance with its, own internal ATM cell routing table, for transmission to TA 715-2. The latter uses the LI value in the received AAL-2 header to extract the AAL-2 packet for transport on VPI/VCI 1/2. TA 715-2 forms a multiplexed AAL-2 LLC packet stream for VPI/VCI 1/2 that includes the LCC packet from TA 705-1 and any other LLC packets designated for this VPI/VCI. Similarly, in the other direction, TAs 715-1 to 715-3 function in a similar fashion to TA 705-1.

The LLC server improves bandwidth efficiency overall by using fewer but more efficient ATM connections to carry LLCs among multiple end points. In fact, depending on the architecture of a particular network, it may be desirable to use multiple LLC Servers to provide efficient transport of AAL-2-type packets over multiple ATM connections.

It should also be noted that although AAL-2 was used on both the "Incoming" and "Outgoing" routing tables, it is also possible to use the inventive concept to convert from, e.g., "Incoming" AAL-2 LLC packets to "Outgoing" AAL-5 packets, e.g., where each AAL-5 packets comprises the payload from one LCC packet. This would be the case if bandwidth efficiency is not an issue on the "Outgoing" side. In this instance, the routing table is suitably modified, e.g., to delete the CID field from the "Outgoing" portion.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was described in the context of digital cellular/PCS, the inventive concept is also applicable to other areas such as PBX (Private Branch Exchange)-to-PBX trunking for the case in which an adjunct to the PBX compresses the voice, suppresses silence (if so desired) and implements AAL-2; ATM trunking; and ATM backbone connectivity to packet telephony. Also, although particular forms of a routing table were described above, other forms of updating and mapping are possible.

Figure 10:
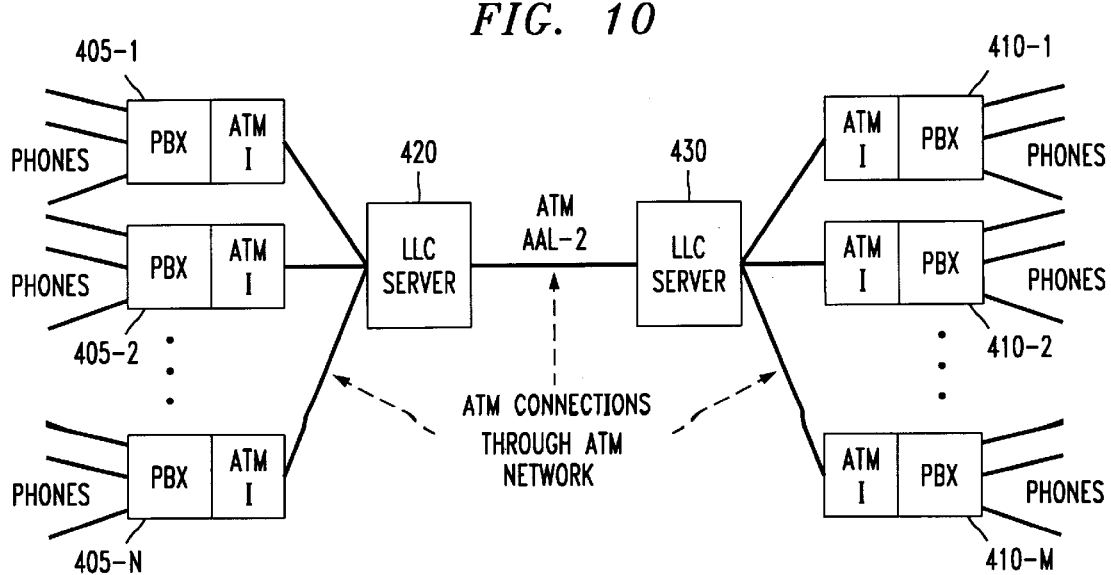
FIG. 10 shows another illustrative communications system using LLC Servers.

An illustration of a PBX-to-PBX application is shown in FIG. 10. PBX 405-1 through PBX 405-N represent a number of PBXs connected to LLC Server 420. For example, these PBXs are located on the east coast of the United States. Similarly, PBX 410-1 through PBX 410-M represent a number of PBXs connected to LLC Server 430 and are illustratively located on the west coast of the United States. (It should be noted that the values for N and M are not related to each other and could be equal to each other.) Each PBX provides service to a variety of telephony-type equipment as represented by the term "phones" and includes circuitry, as represented by the "ATM I" portion, for providing voice compression, silence suppression, and implementation of ATM using AAL-2. In this architecture, each PBX provides to, and receives from, its respective LLC server compressed voice packets. For long haul transmission, each LLC Server rebundles the compressed voice packets into, illustratively, one ATM AAL-2 connection. Each LLC server switches LLC packets from the ATM connection to the appropriate PBX using a routing table similar in approach to the one described above.

What is claimed:

1. An improved apparatus for terminating asynchronous transfer mode (ATM) virtual connections for communicating ATM cells, each ATM cell formatted for communicating multiple packets, the improvement comprising:
   equipment adapted to switch packets from at least one ATM cell associated with one ATM virtual connection to another ATM cell associated with a different ATM virtual connection.

2. The apparatus of claim 1 wherein the equipment performs switching at the sub-ATM cell level using a logical link connection identifier.

3. The apparatus of claim 1 wherein the equipment is a logical link connection server.

4. The apparatus of claim 1 wherein ATM virtual connections are virtual path connections or virtual circuit connections.

5. The apparatus of claim 1 wherein the packets are formatted in accordance with an ATM adaptation layer for small packets.

6. The apparatus of claim 5 wherein the ATM adaptation layer is AAL-2.

7. The apparatus of claim 1 wherein the equipment includes circuitry for storing a routing table for use in switching the packets, the routing table including mapping information associating an identifier of a packet, recovered from a received ATM cell, with a destination ATM connection.

8. The apparatus of claim 1 wherein the equipment terminates a first set of ATM virtual connections and a second set of ATM virtual connections, and the equipment switches packets between ATM virtual connections in the first set and ATM virtual connections in the second set.

9. The apparatus of claim 8 wherein the equipment communicates over the first set of ATM virtual connections with a plurality of vocoder groups, and over the second set of ATM virtual connections with a plurality of cellular equipment endpoints.

10. The apparatus of claim 9 wherein the cellular equipment endpoints are cellular base stations.

11. Apparatus for switching comprising:
    circuitry for enabling a first set of asynchronous transfer mode (ATM) connections and a second set of ATM connections; and
    a switching element for switching packets from an ATM connection in the first set to an ATM connection in the second set
    wherein the switching element communicates over the first set of ATM connections with a plurality of vocoder groups, and over the second set of ATM connections with a plurality of cellular equipment endpoints.

12. The apparatus of claim 11 wherein ATM connections are virtual path connections or virtual circuit connections.

13. The apparatus of claim 11 wherein each packet is smaller than an ATM cell size.

14. The apparatus of claim 13 wherein each packet conforms to ATM Adaptation Layer for small packets.

15. The apparatus of claim 14 wherein each packet conforms to ATM Adaptation Layer-2 (AAL-2).

16. The apparatus of claim 11 wherein the switching element switches packets in accordance with a routing table, the routing table including mapping information associating an identifier of a small packet, recovered from a received ATM cell, with a destination ATM connection.

17. A method for use in communications, the method comprising the steps of:
    receiving from an asynchronous transfer mode (ATM) virtual connection a stream of ATM cells, where each ATM cell is formatted for communicating more than one packet; and routing packets from the same ATM cell to different ATM virtual connections.

18. The method of claim 17 wherein the routing step includes the steps of:

selecting another ATM virtual connection as a function of an identification number of each packet; and rebundling the respective packet into the selected ATM virtual connection.

19. The method of claim 18 wherein each ATM connection is formatted in accordance with an ATM Adaptation Layer for small packets.

20. A method for use in an asynchronous transfer mode (ATM) type communications the method comprising the steps of:

establishing an ATM virtual circuit connection (VCC);

recovering from the established VCC a) packets, b) a VCC identifier, and c) a packet identifier for each recovered packet;

identifying, for each recovered packet, another ATM VCC, the identification performed as a function of the recovered VCC identifier and, for each recovered packet, the respective packet identifier; and transferring each packet into the identified ATM VCC for that packet.

21. The method of claim 20 wherein the transferring step includes the step of changing the respective packet identifier to a new packet identifier.

22. The method of claim 20 wherein each packet is a small packet, which is less than an ATM cell size.

23. The method of claim 22 wherein the establishing step includes the step of establishing an ATM Adaptation Layer 2 (AAL-2) connection.

24. The method of claim 20 further comprising the step of establishing the other ATM VCC as an ATM Adaptation Layer 5 (AAL-5) connection.

25. The method of claim 20 further comprising the step of maintaining a routing table that associates recovered VCC identifiers and packet identifiers with other ATM VCCs.

26. The method of claim 25 wherein the recovered VCC identifier is a base station equipment identifier.

27. The method of claim 20 further comprising the step of establishing the other ATM VCC as an ATM AAL-2 connection.

28. A method for use in an asynchronous transfer mode (ATM) type communications the method comprising the steps of:

establishing an ATM virtual circuit connection (VCC);

recovering from the established VCC a) packets, b) a VCC identifier, and c) a packet identifier for each recovered packet;

identifying, for each recovered packet, another ATM VCC, the identification performed as a function of the recovered VCC identifier and, for each recovered packet, the respective packet identifier; and providing a new ATM cell such that a header of the new ATM cell includes the identified ATM VCC and at least one recovered packet.

29. The method of claim 28 wherein the providing step includes the step of changing the respective packet identifier to a new packet identifier.

30. The method of claim 28 wherein each packet is a small packet, which is less than an ATM cell size.

31. The method of claim 30 wherein the establishing step includes the step of establishing an ATM Adaptation Layer 2 (AAL-2) connection.

32. The method of claim 28 further comprising the step of maintaining a routing table that associates recovered VCC identifiers and packet identifiers with other ATM VCCs.

33. The method of claim 32 wherein the recovered VCC identifier is a base station equipment identifier.

34. The method of claim 32 wherein the maintaining step includes the step of updating the routing table to reflect changes to the associations between recovered VCC identifiers and packet identifiers with other ATM VCCs as the result of a hand-off condition.

35. A method for use in an asynchronous transfer mode (ATM) type communications the method comprising the steps of:

(a) using an ATM switch for extracting shorts packets from a received ATM cell associated with an ATM VCC; and (b) using the ATM switch to transfer the extracted short packets to another ATM cell associated with other ATM VCCs.

36. The method of claim 35 wherein in step (a) the ATM switch extracts short packets as a function of a length indicator associated with the short packet.

37. The method of claim 35 wherein each extracted short packet has an associated packet identification number and wherein in step (b) the ATM switch multiplexes each extracted packet with other extracted packets riding on an identical VCC.

38. The method of claim 37 wherein in step (b) the ATM switch alters the packet identification number of each extracted packet before transferring the packet to the other VCC.

39. The method of claim 35 wherein each short packet is formatted in accordance with ATM Adaptation Layer 2 (AAL-2).

* * * * *